United States Patent
Kohno et al.

(10) Patent No.: US 7,884,173 B2
(45) Date of Patent: Feb. 8, 2011

(54) AROMATIC POLYESTER AND MANUFACTURING PROCESS THEREOF

(75) Inventors: Kazuteru Kohno, Iwakuni (JP); Eiji Kinoshita, Anpachi-gun (JP); Tomoyuki Kishino, Matsuyama (JP)

(73) Assignee: Teijin Limited, Osaka-shi (JP)

( * ) Notice: Subject to any disclaimer, the term of this patent is extended or adjusted under 35 U.S.C. 154(b) by 116 days.

(21) Appl. No.: 12/374,538

(22) PCT Filed: Jul. 19, 2007

(86) PCT No.: PCT/JP2007/064630

§ 371 (c)(1),
(2), (4) Date: Jan. 21, 2009

(87) PCT Pub. No.: WO2008/010607

PCT Pub. Date: Jan. 24, 2008

(65) Prior Publication Data

US 2010/0016539 A1    Jan. 21, 2010

(30) Foreign Application Priority Data

Jul. 21, 2006 (JP) .......................... 2006-199481
Apr. 13, 2007 (JP) .......................... 2007-105754
Apr. 13, 2007 (JP) .......................... 2007-105756

(51) Int. Cl.
*C08G 63/06* (2006.01)
*C08G 63/12* (2006.01)

(52) U.S. Cl. .................. 528/209; 524/493; 524/604; 525/177; 528/176; 528/190; 528/193; 528/194; 528/271; 528/272

(58) Field of Classification Search ......... 524/493, 524/604; 525/177; 528/176, 190, 193, 194, 528/209, 271, 272
See application file for complete search history.

(56) References Cited

U.S. PATENT DOCUMENTS 4,581,438 A    4/1986 Inata et al.
2010/0120967 A1* 5/2010 Kinoshita et al. ........... 524/493

FOREIGN PATENT DOCUMENTS

| JP | 60-135428 A | 7/1985 |
| JP | 60-221420 A | 11/1985 |
| JP | 61-143425 A | 7/1986 |
| JP | 61-145724 A | 7/1986 |
| JP | 61-148237 A | 7/1986 |
| JP | 61-152641 A | 7/1986 |
| JP | 61-238824 A | 10/1986 |
| JP | 61-246229 A | 11/1986 |
| JP | 2-97524 A | 4/1990 |
| JP | 6-145323 A | 5/1994 |
| JP | 11-147944 A | 6/1999 |
| JP | 2001-139671 A | 5/2001 |
| JP | 2004-292647 A | 10/2004 |
| JP | 2005-272509 A | 10/2005 |
| JP | 2006-188576 A | 7/2006 |

OTHER PUBLICATIONS

International Search Report of PCT/JP2007/064630, date of mailing Sep. 4, 2007.
Notification of Transmittal of Translation of the International Preliminary Report on Patentability (Form PCT/IB/338) of International Application No. PCT/JP2007/064630 mailed Feb. 5, 2009 with Forms PCT/IB/373 and PCT/ISA/237.
Supplementary European Search Report dated Jan. 25, 2010, issued in corresponding European Patent Application No. 07791330.9.

* cited by examiner

*Primary Examiner*—Terressa M Boykin
(74) *Attorney, Agent, or Firm*—Westerman, Hattori, Daniels & Adrian, LLP

(57) ABSTRACT

To provide an aromatic polyester which is formed into a film having excellent heat resistance, color, mechanical properties, dimensional stability and gas barrier properties and a manufacturing process thereof;

the aromatic polyester comprises a dicabroxylic acid component and a diol component, wherein (i) the dicarboxylic acid component contains 50 to 100 mol % of a recurring unit represented by the following formula (A):

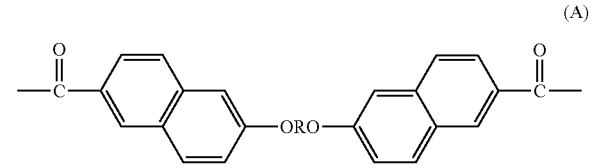

(A)

wherein R is an alkylene group having 2 to 10 carbon atoms, (ii) the aromatic polyester has an intrinsic viscosity measured at 35° C. by using a mixed solvent of P-chlorophenol and 1,1,2,2-tetrachloroethane (weight ratio of 40/60) of 0.4 to 3.0;

(iii) the aromatic polyester has a content of a recurring unit represented by the following formula (D) of less than 10 mol %:

—O—CH$_2$CH$_2$—O—CH$_2$CH$_2$—O—   (D)

(iv) the aromatic polyester has a terminal carboxyl group concentration of 200 eq/ton or less; and (v) the aromatic polyester has an alkali metal content of 300 ppm or less.

15 Claims, 6 Drawing Sheets

AROMATIC POLYESTER AND MANUFACTURING PROCESS THEREOF

TECHNICAL FIELD

The present invention relates to an aromatic polyester comprising 6,6'-(alkylenedioxy)di-2-naphthoic acid as the main dicarboxylic acid component and a manufacturing process thereof.

BACKGROUND ART

Heretofore, various aromatic dicarboxylic acids have been known and widely used as raw materials for condensation polymers such as polyesters and polyamides. For example, terephthalic acid is industrially used as a raw material for polyethylene terephthalate, polytetraethylene terephthalate and polyparaphenylene terephthalamide. Isophthalic acid is also widely used as a raw material for polymers. It is known that polyethylene naphthalene dicarboxylate (polyethylene naphthalate) which is a polyester obtained from naphthalenedicarboxylic acid is superior to polyethylene terephthalate in mechanical properties and heat resistance.

Further, demand for raw materials having excellent physical and chemical properties is growing due to progress in technology. For instance, polyethylene terephthalate is widely used in resins, fibers and films, and polyethylene terephthalate films are widely used as they have excellent heat resistance, strength and Young's modulus. However, it is still hard to say that they have satisfactory properties depending on application purpose. Although a liquid crystalline polyester is an excellent material having a high Young's modulus, high melting point and high fluidity, when it is melt molded, it is readily oriented in a monoaxial direction and therefore it is difficult to obtain a biaxially oriented film like polyethylene terephthalate.

As a polyester having higher performance than polyethylene naphthalate, there is proposed an aromatic polyester comprising 6,6'-(alkylenedioxy)di-2-naphthoic acid (may be referred to as "NEO-H" hereinafter) as a dicarboxylic acid component. NEO-H has low solubility in a diol component such as ethylene glycol when it is in an acid form and it is difficult to handle it at the time of a polymerization reaction. Therefore, it is proposed to manufacture an aromatic polyester by transesterifying an ethyl ester of NEO-H (may be referred to as "NEO-ester" hereinafter) with ethylene glycol and polycondensing the resulting product (patent documents 1 to 4).

However, since the transesterification reaction in this case is carried out while ethanol formed by the reaction is discharged, the amount of ethylene glycol decreases along with the proceeding of the reaction, and a polyester precursor formed by the reaction is crystallized to be solidified, whereby stirring becomes difficult and the reaction time becomes long. The obtained aromatic polyester is apt to contain a diethylene glycol component represented by the formula (D) which tends to deteriorate the physical properties of the aromatic polyester.

Since the NEO-ester has an extremely high boiling point, it is difficult to distill it, and purification by recrystallization must be carried out, thereby making it difficult to purify it at a low cost. Consequently, it is difficult to manufacture an aromatic polyester on an industrial scale from the NEO-ester as a starting material.

(Patent Document 1) JP-A 60-135428
(Patent Document 2) JP-A 60-221420
(Patent Document 3) JP-A 61-145724
(Patent Document 4) JP-A 6-145323

DISCLOSURE OF THE INVENTION

It is therefore an object of the present invention to provide a process of manufacturing a novel aromatic polyester without using the NEO-ester as a starting material. It is another object of the present invention to provide an aromatic polyester having a low content of a diethylene glycol component represented by the formula (D) and excellent heat resistance and color, and a manufacturing process thereof. It is still another object of the present invention to provide a film having excellent mechanical properties, dimensional stability and gas barrier properties.

The inventors of the present invention have studied a process of manufacturing an aromatic polyester by esterifying the NEO-H directly with a diol component. As a result, they have found that when a polyester precursor having a predetermined esterification rate is obtained through an esterification reaction and polycondensed, an aromatic polyester having a low content of a diethylene glycol component represented by the formula (D) and excellent heat resistance can be obtained. The present invention has been accomplished based on this finding.

That is, the present invention is an aromatic polyester comprising a dicarboxylic acid component and a diol component, wherein (i) the dicarboxylic acid component contains 50 to 100 mol % of a recurring unit represented by the following formula (A) and 50 to 0 mol % of a recurring unit represented by the following formula (B), and the diol component contains 90 to 100 mol % of a recurring unit represented by the following formula (C),

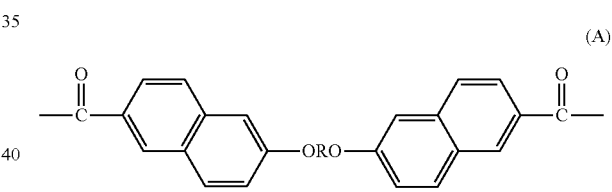

wherein R is an alkylene group having 2 to 10 carbon atoms,

wherein Ar is a hydrocarbon group having 2 to 10 carbon atoms;

(ii) the aromatic polyester has an intrinsic viscosity measured at 35° C. by using a mixed solvent of P-chlorophenol and 1,1,2,2-tetrachloroethane (weight ratio of 40/60) of 0.4 to 3.0;

(iii) the aromatic polyester has a content of a recurring unit represented by the following formula (D) of less than 10 mol %;

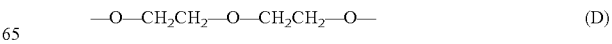

(iv) the aromatic polyester has a terminal carboxyl group concentration of 200 eq/ton or less; and (v) the aromatic polyester has an alkali metal content of 300 ppm or less.

Further, the present invention is a process of manufacturing an aromatic polyester, comprising the steps of:

(1) reacting a dicarboxylic acid component containing a compound represented by the following formula (a):

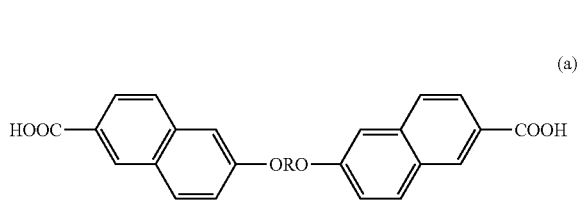

(a)

wherein R is an alkylene group having 2 to 10 carbon atoms, with a diol component containing ethylene glycol to obtain a polyester precursor containing a compound represented by the following formula (a-1):

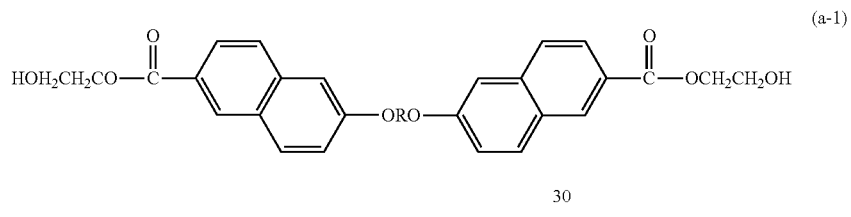

(a-1)

wherein R is an alkylene group having 2 to 10 carbon atoms, and having an esterification rate of 85%; and (2) polymerizing the polyester precursor in the presence of a polymerization catalyst.

BEST MODE FOR CARRYING OUT THE INVENTION

Aromatic Polyester

Figure 1:
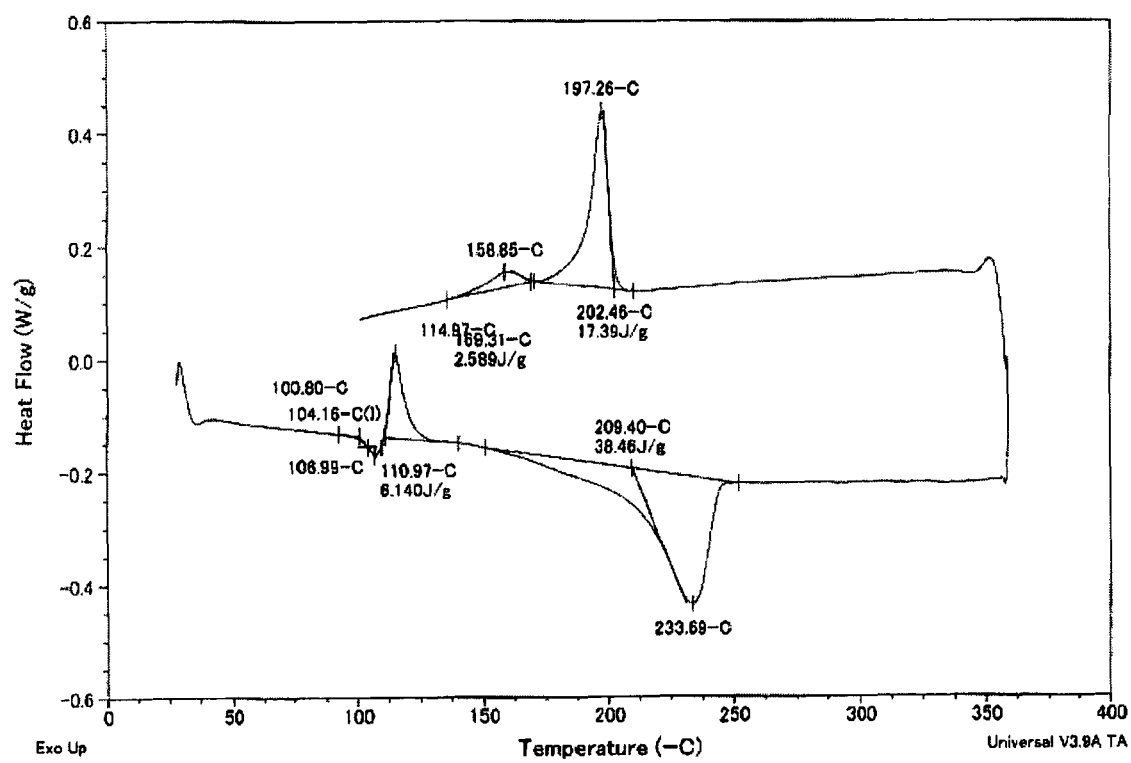
FIG. 1 is a DSC measurement chart of the aromatic polyester of Example 6.

The aromatic polyester of the present invention comprises a dicarboxylic acid component and a diol component.

The dicarboxylic acid component contains 50 to 100 mol % of a recurring unit represented by the following formula (A) and 50 to 0 mol % of a recurring unit represented by the following formula (B).

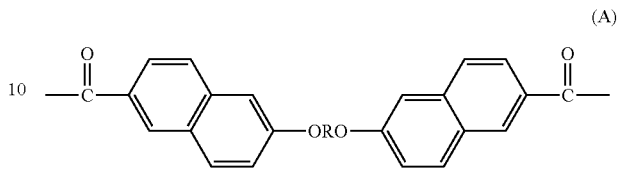

(A)

In the formula (A), R is an alkylene group having 2 to 10 carbon atoms. Examples of the alkylene group include ethylene group, isopropylene group, trimethylene group, tetramethylene group, hexamethylene group and octamethylene group.

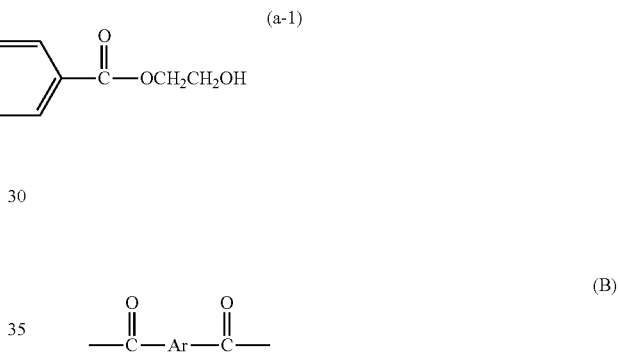

(B)

In the formula (B), Ar is a hydrocarbon group having 2 to 10 carbon atoms. The nucleus of the hydrocarbon group may be substituted by a lower alkyl group or halogen. Examples of the hydrocarbon group include aromatic hydrocarbon groups, alicyclic hydrocarbon groups and aliphatic hydrocarbon groups. The aromatic hydrocarbon groups include phenylene group, naphthalenediyl group and biphenylylene group. The alicyclic hydrocarbon groups include cycloalkylenes having 6 to 12 carbon atoms. The aliphatic hydrocarbon groups include alkylenes having 2 to 12 carbon atoms.

The diol component contains 90 to 100 mol %, preferably 95 to 100 mol %, more preferably 98 to 100 mol % of a recurring unit derived from ethylene glycol and represented by the following formula (C).

(C)

Other diol components include a recurring unit represented by the following formula (C-1).

(C-1)

In the formula (C-1), $R^c$ is an alkylene group having 3 to 8 carbon atoms. Examples of the alkylene group include isopropylene group, trimethylene group, tetramethylene group, hexamethylene group and octamethylene group.

The content of the ester unit (-(A)-(C)-) composed of the recurring unit represented by the formula (A) and the recurring unit represented by the formula (C) is preferably 50 to 100%, more preferably 70 to 100 mol %, much more preferably 80 to 100 mol % of the total of all the recurring units.

The aromatic polyester of the present invention has an intrinsic viscosity measured at 35° C. by using a mixed solvent of P-chlorophenol and 1,1,2,2-tetrachloroethane (weight ratio of 40/60) of 0.4 to 3.0, preferably 0.5 to 2.8, more preferably 0.6 to 2.5.

The aromatic polyester of the present invention has a content of a recurring unit represented by the following formula (D) of less than 10 mol %, preferably 0.01 to 9 mol %, more preferably 0.01 to 8 mol % of.

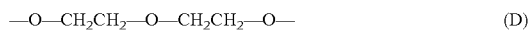
—O—CH$_2$CH$_2$—O—CH$_2$CH$_2$—O—   (D)

When the recurring unit represented by the formula (D) is contained in the polymer skeleton, the rigidity of the main chain is lost, thereby causing the deterioration of mechanical properties and heat resistance. The recurring unit represented by the formula (D) is formed by a reaction between glycol components or a reaction between the hydroxyl terminals of a polymer. The content of the recurring unit represented by the formula (D) can be measured by means of a nuclear magnetic resonance apparatus.

The aromatic polyester of the present invention has a terminal carboxyl group concentration of 200 eq/ton or less, preferably 0.1 to 150 eq/ton, more preferably 0.1 to 100 eq/ton.

An aromatic polyester generally has a small equilibrium constant of a polycondensation reaction. Therefore, when the terminal carboxyl group concentration increases, the water absorption coefficient rises and hydrolysis tends to occur by the acid catalytic function of a carboxyl group. Therefore, it is important that the terminal carboxyl group concentration should be reduced to improve hydrolysis resistance. Even when solid-phase polymerization is carried out to increase the polymerization degree of the obtained aromatic polyester, if the terminal carboxyl group concentration is high, reactivity lowers and the time required for solid-phase polymerization becomes long with the result of a reduction in productivity, which is not preferred from the industrial point of view. The terminal carboxyl group concentration can be adjusted by the esterification rate of the polyester precursor and the reaction pressure.

The aromatic polyester of the present invention has an alkali metal content of 300 ppm or less, preferably 1 to 200 ppm, more preferably 1 to 50 ppm. When the alkali metal content is higher than 300 ppm, the transparency and molecular weight of the obtained polyester lower and the mechanical strength of the polyester degrades. In the present invention, the term "alkali metal content" means the total amount of metal sodium and metal potassium. The alkali metal content can be measured by atomic absorption photometry.

Since the compound represented by the formula (a) which is a raw material of the aromatic polyester of the present invention is manufactured through an alkali metal salt, it contains alkali metals as impurities. Therefore, the compound represented by the formula (a) is preferably used as a raw material after its alkali metal content is reduced. The alkali metal content can be reduced by converting the compound represented by the formula (a) into an amine salt or an ammonium salt and then decomposing the salt by acid deposition or heating.

First Embodiment

An aromatic polyester (1) comprising a dicarboxylic acid component which contains a recurring unit represented by the following formula (A-1) (R is an ethylene group in the formula (A)) as the main constituent and having a melting point of 295° C. or higher is preferred as the aromatic polyester. The expression "as the main constituent" means that the content of the recurring unit is preferably 90 to 100 mol %, more preferably 95 to 100 mol %, much more preferably 99 to 100 mol %.

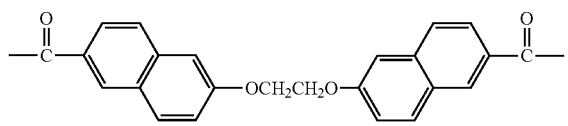
(A-1)

The diol component of the aromatic polyester (1) contains the recurring unit represented by the following formula (C) in an amount of preferably 90 to 100 mol %, more preferably 95 to 100 mol %.

—O—CH$_2$CH$_2$—O—   (C)

Other diol components include the recurring unit represented by the following formula (C-1).

—O—R$^c$—O—   (C-1)

In the formula (C-1), R$^c$ is an alkylene group having 3 to 8 carbon atoms. Examples of the alkylene group include isopropylene group, trimethylene group, tetramethylene group, hexamethylene group and octamethylene group.

The aromatic polyester (1) has an intrinsic viscosity measured at 35° C. by using a mixed solvent of P-chlorophenol and 1,1,2,2-tetrachloroethane (weight ratio of 40/60) of 0.4 to 3.0. The aromatic polyester (1) has a content of the recurring unit represented by the following formula (D) of less than 10 mol %.

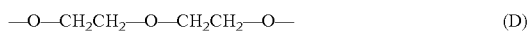
—O—CH$_2$CH$_2$—O—CH$_2$CH$_2$—O—   (D)

The aromatic polyester (1) has a terminal carboxyl concentration of 200 eq/ton or less. The aromatic polyester (1) has an alkali metal content of 300 ppm or less.

Second Embodiment

An aromatic polyester (2) comprising a dicarboxylic acid component which contains 50 to 80 mol % of the recurring unit represented by the formula (A) and 50 to 20 mol % of a recurring unit represented by the following formula (B-1) and having a melting point of 225 to 265° C. is preferred as the above aromatic polyester.

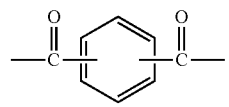
(B-1)

The diol component contains the recurring unit represented by the following formula (C) in an amount of 90 to 100 mol %, preferably 95 to 100 mol %, more preferably 98 to 100 mol %.

—O—CH$_2$CH$_2$—O—   (C)

Other diol components include the recurring unit represented by the following formula (C-1).

—O—R$^c$—O—   (C-1)

In the formula (C-1), R$^c$ is an alkylene group having 3 to 8 carbon atoms. Examples of the alkylene group include isopropylene group, trimethylene group, tetramethylene group, hexamethylene group and octamethylene group.

The aromatic polyester (2) has an intrinsic viscosity measured at 35° C. by using a mixed solvent of P-chlorophenol and 1,1,2,2-tetrachloroethane (weight ratio of 40/60) of 0.4 to 3.0. The aromatic polyester (2) has a content of the recurring unit represented by the following formula (D) of less than 10 mol %.

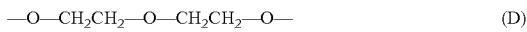

(D)

The aromatic polyester (2) has a terminal carboxyl concentration of 200 eq/ton or less. The aromatic polyester (2) has an alkali metal content of 300 ppm or less.

The melting point of the aromatic polyester (2) is preferably 225 to 265° C., more preferably 235 to 260° C. from the viewpoint of film formability. When the melting point is higher than 265° C., flowability deteriorates at the time of melt extrusion and molding, whereby delivery may become nonuniform. When the melting point is lower than 225° C., the mechanical properties of polyethylene terephthalate tend to be impaired though film formability is excellent.

It is preferred from the viewpoints of heat resistance and dimensional stability that the aromatic polyester (2) should have a glass transition temperature measured by DSC (may be referred to as Tg hereinafter) of preferably 100 to 115° C., more preferably 108 to 115° C. When Tg is lower than the lower limit, the heat resistance and mechanical strength of the aromatic polyester may become unsatisfactory. The aromatic polyester (2) of the present invention has excellent moldability.

Although the aromatic polyester (1) containing the recurring unit represented by the formula (A) as the main constituent has excellent dimensional stability, it has such a high melting point and such high crystallinity that it has low flowability in a molten state. Since the aromatic polyester (2) contains the non-liquid crystalline recurring unit represented by the formula (B-1), it is excellent in dimensional stability, moldability and gas barrier properties.

The aromatic polyester (2) preferably forms an optically anisotropic molten phase. When the aromatic polyester (2) is heated up to 320° C. at a temperature elevation rate of 20° C./min and then cooled at a rate of 10° C./min in the DSC measurement, two heat absorption peaks are preferably observed at a range of 120 to 235° C.

In the XRD measurement of an amorphous material obtained by melting the aromatic polyester (2) at 340° C. and quenching it in an iced bath, the ratio Q of a peak top intensity (Ap) observed at a 2θ of 20 to 210 to a peak top intensity (Lp) observed at a 2θ of 7.5 to 9.00 preferably satisfies the relationship represented by the following equation (I).

$$Q = Lp/Ap < 0.2 \quad (I)$$

The optical anisotropy of the aromatic polyester (2) can be adjusted by the content of the recurring unit represented by the formula (A).

Third Embodiment

An aromatic polyester (3) comprising a dicarboxylic acid component which contains 50 to 80 mol % of the recurring unit represented by the formula (A) and 50 to 20 mol % of a recurring unit represented by the following formula (B-2) and having a melting point of 235 to 270° C. is preferred as the above aromatic polyester.

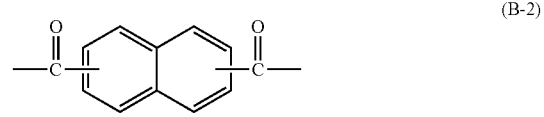

(B-2)

The diol component contains the recurring unit represented by the following formula (C) in an amount of 90 to 100 mol %, preferably 95 to 100 mol %, more preferably 98 to 100 mol %.

(C)

Other diol components include the recurring unit represented by the following formula (C-1).

(C-1)

In the formula (C-1), $R^c$ is an alkylene group having 3 to 8 carbon atoms. Examples of the alkylene group include isopropylene group, trimethylene group, tetramethylene group, hexamethylene group and octamethylene group.

The aromatic polyester (3) has an intrinsic viscosity measured at 35° C. by using a mixed solvent of P-chlorophenol and 1,1,2,2-tetrachloroethane (weight ratio of 40/60) of 0.4 to 3.0. The aromatic polyester (3) has a content of the recurring unit represented by the following formula (D) of less than 10 mol %.

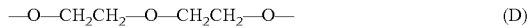

(D)

The aromatic polyester (3) has a terminal carboxyl concentration of 200 eq/ton or less. The aromatic polyester (3) has an alkali metal content of 300 ppm or less.

The melting point measured by DSC of the aromatic polyester (3) is preferably 235 to 270° C., more preferably 240 to 265° C. It is preferred from the viewpoints of film formability and mechanical properties that the melting point should fall within this range. When the melting point is higher than the upper limit, flowability deteriorates at the time of melt extrusion and molding, whereby delivery may become nonuniform. When the melting point is lower than the lower limit, the mechanical properties of the aromatic polyester having the recurring unit represented by the formula (A) tend to be impaired though it has excellent film formability.

The aromatic polyester (3) has a glass transition temperature (Tg) measured by DSC of preferably 105 to 115° C., more preferably 107 to 113° C. It is preferred from the viewpoints of heat resistance and dimensional stability that Tg should fall within this range. When Tg is lower than the lower limit, the heat resistance and mechanical strength of the aromatic polyester may become unsatisfactory.

Since the aromatic polyester (3) contains the recurring unit represented by the formula (A) and the recurring unit represented by the formula (B-2), it has excellent moldability.

Although the aromatic polyester (1) containing the recurring unit represented by the formula (A) as the main constituent has excellent dimensional stability, it has such a high melting point and such high crystallinity that it has low flowability in a molten state. Since the aromatic polyester (3) contains the non-liquid crystalline recurring unit represented by the formula (B-2), it is excellent in dimensional stability, moldability and gas barrier properties.

The aromatic polyester (3) preferably forms an optically anisotropic molten phase. In the XRD measurement of an amorphous material obtained by melting the aromatic polyester (3) at 340° C. and quenching it in an iced bath, the ratio Q of a peak (Ap) observed at a 2θ of 20 to 210 to a peak (Lp)

observed at a 2θ of 7.5 to 9.0° preferably satisfies the relationship represented by the following equation (I).

$$Q = Lp/Ap < 0.2 \qquad (I)$$

When the aromatic polyester (3) is heated up to 320° C. at a temperature elevation rate of 20° C./min and then cooled at a rate of 10° C./min in the DSC measurement, two heat absorption peaks are preferably observed at a range of 120 to 220° C. The optical anisotropy of the aromatic polyester (3) can be adjusted by the content of the recurring unit represented by the formula (A).

<Manufacturing Process>

The aromatic polyester of the present invention can be manufactured through (i) the first step for obtaining a polyester precursor by reacting a dicarboxylic acid component with a diol component until the esterification rate of the polyester precursor becomes 85% and (ii) the second step for polymerizing the polyester precursor in the presence of a polymerization catalyst.

(First Step)

The first step is to obtain a polyester precursor having an esterification rate of 85% by reacting a dicarboxylic acid component with a diol component.

The dicarboxylic acid component contains a compound represented by the following formula (a).

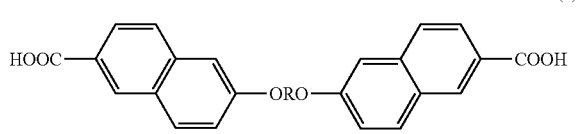

(a)

In the above formula, R is an alkylene group having 2 to 10 carbon atoms. Examples of the alkylene group include ethylene group, isopropylene group, trimethylene group, tetramethylene group, hexamethylene group and octamethylene group.

The content of the compound represented by the formula (a) in the dicarboxylic acid component is 50 to 100 mol %.

The compound represented by the formula (a) contains alkali metals as impurities because the alkali metals are used to manufacture the compound. When the alkali metals are contained in the aromatic polyester, the color of the aromatic polyester becomes worse. Therefore, it is preferred to reduce the alkali metal content of the compound represented by the formula (a) as a raw material.

The alkali metal content can be reduced by the following method. For example, the alkali metal content can be reduced by converting the compound represented by the formula (a) into an amine salt or an ammonium salt and then decomposing the salt by acid deposition or heating. Alternatively, the alkali metal content can be reduced by the acid deposition of the compound represented by the formula (a) in the presence of a water-soluble organic solvent such as ethanol. Further, the alkali metal content can be reduced by suspending the compound represented by the formula (a) in water to react it at 80 to 300° C. and repeating the operation of acid deposition.

The alkali metal content of the compound represented by the formula (a) is preferably 5 to 200 ppm, more preferably 5 to 100 ppm, much more preferably 5 to 50 ppm.

The dicarboxylic acid component may contain a compound represented by the following formula (b). The content of the compound represented by the formula (b) is 50 to 0 mol %.

(b)

In the formula (b), Ar is a hydrocarbon group having 2 to 10 carbon atoms. The nucleus of the hydrocarbon group may be substituted by a lower alkyl group or halogen. Examples of the hydrocarbon group include aromatic hydrocarbon groups, alicyclic hydrocarbon groups and aliphatic hydrocarbon groups. The aromatic hydrocarbon groups include phenylene group, naphthalenediyl group and biphenylylene group. The alicyclic hydrocarbon groups include cycloalkylenes having 6 to 12 carbon atoms. The aliphatic hydrocarbon groups include alkylenes having 2 to 12 carbon atoms.

Examples of the compound represented by the formula (b) include aromatic dicarboxylic acids, alicyclic dicarboxylic acids and aliphatic dicarboxylic acids. The aromatic dicarboxylic acids include terephthalic acid, phthalic acid, isophthalic acid, 1,4-phenylenedioxydicarboxylic acid, 1,3-phenylenedioxydiacetic acid, 4,4'-diphenyldicarboxylic acid, 4,4'-diphenylether dicarboxylic acid, 4,4'-diphenyketone dicarboxylic acid, 4,4'-diphenoxyethane dicarboxylic acid, 4,4'-diphenylsulfone dicarboxylic acid and 2,6-naphthalenedicarboxylic acid. The alicyclic dicarboxylic acids include hexahydroterephthalic acid and hexahydroisophthalic acid. The aliphatic dicarboxylic acids include succinic acid, glutaric acid, adipic acid, pimelic acid, suberic acid, azelaic acid, sebacic acid, undecadicarboxylic acid and dodecadicabroxylic acid. These compounds represented by the formula (b) may be used alone or in combination of two or more. Out of these, terephthalic acid, isophthalic acid and 2,6-naphthalenedicarboxylic acid are preferably used.

The dicarboxylic acid component preferably contains the compound represented by the formula (a) as the main constituent (first embodiment). The expression "as the main constituent" means that the content of the compound is preferably 90 to 100 mol %, more preferably 95 to 100 mol %, much more preferably 99 to 100 mol %.

The dicarboxylic acid component preferably contains 50 to 80 mol % of the compound represented by the formula (a) and 50 to 20 mol % of the compound represented by the formula (b) (second and third embodiments).

The diol component contains ethylene glycol. The content of ethylene glycol is 90 to 100 mol %, preferably 95 to 100 mol %, more preferably 95 to 100 mol %.

Other diol components include an alkylene glycol having 3 to 8 carbon atoms. Examples of the alkylene glycol include isopropylene glycol, tetramethylene glycol, hexamethylene glycol and octamethylene glycol.

To manufacture the aromatic polyester, another comonomer may be used in limits not prejudicial to the object and effect of the present invention besides the dicarboxylic acid component and the glycol component. Examples of the another comonomer include hydroxycarboxylic acids such as glycolic acid, p-hydroxybenzoic acid and p-β-hydroxyethoxybenzoic acid, monofunctional components such as alkoxycarboxylic acid, stearyl alcohol, benzyl alcohol, stearic acid, behenic acid, benzoic acid, t-butylbenzoic acid and benzoylbenzoic acid, and polyfunctional components having a functionality of 3 or more such as tricarballylic acid, trimellitic acid, trimesic acid, pyromellitic acid, naphthalene-tetracarboxylic acid, gallic acid, trimethylolethane, trimethylolpropane, glycerol, pentaerythritol and sugar ester.

The first step is to obtain the polyester precursor by esterifying an aromatic dicarboxylic acid. The reaction is preferably carried out at a temperature equal to or higher than the boiling point of the glycol component. Therefore, the reaction temperature is preferably 150 to 250° C., more preferably 180 to 230° C. When the reaction temperature is lower than 150° C., the esterification reaction does not proceed fully and when the reaction temperature is higher than 250° C., a glycol as a side reaction product is formed disadvantageously.

Although the reaction may be carried out at normal pressure, when it is carried out under increased pressure, the esterification reaction proceeds easily. Therefore, the esterification reaction is preferably carried out at a high temperature and a high pressure. The reaction pressure is preferably 10 to 200 kPa, more preferably 20 to 150 kPa in terms of absolute pressure.

The reaction time is preferably 10 minutes to 10 hours, more preferably 30 minutes to 7 hours. The reaction product as the polyester precursor is obtained by this esterification reaction.

The indication of the end of the esterification reaction is preferably a point of time when the esterification rate becomes 85% or more, preferably 90% or more. If the esterification is terminated when the esterification rate is lower than 85% and the step proceeds to the subsequent polycondensation reaction, a polyester having a desired degree of polymerization and a desired terminal carboxyl concentration cannot be obtained.

The esterification rate (%) is a value calculated from the following equation. The esterification rate can be determined by nuclear magnetic resonance spectrometry. Esterification rate (%)=number of esterified carboxy groups/number of all carboxyl groups before esterification×100

The amount of the diol component is preferably 1.1 to 4 mols, more preferably 2 to 4 mols, much more preferably 2 to 3 mols based on 1 mol of the dicarboxylic acid component. Since the compound represented by the formula (a) has low solubility in ethylene glycol, the amount of the glycol component is preferably adjusted in consideration of the solubility.

Any catalyst which is commonly used in the direct polymerization process of a polyester may be used as required. Preferred examples of the catalyst include tetra-n-butyl titanate, tetraisopropyl titanate and organic titanium compounds which are hydrolysates thereof.

In the first step, the polyester precursor is obtained. The polyester precursor contains a compound represented by the following formula (a-1). In the formula, R is the same as in the formula (a).

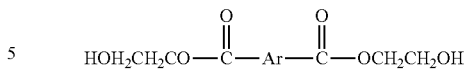

In the first step of the present invention, a dicarboxylic acid component containing 6,6-(alkylenedioxy)di-2-naphthoic acid represented by the formula (a) is reacted with a diol component containing ethylene glycol to obtain a polyester precursor having an esterification rate of 85%, thereby making it possible to obtain an aromatic polyester having a low content of the diethylene glycol component represented by the formula (D) as a side reaction product and a low content of the terminal carboxy group. Further, an aromatic polyester having a low alkali metal content can be obtained. As a result, an aromatic polyester having excellent heat resistance and color is obtained.

Preferably, the polyester precursor contains 50 to 100 mol % of the compound represented by the formula (a-1) and 50 to 0 mol % of the compound represented by the formula (b-1).

The polyester precursor preferably contains the compound represented by the formula (a-1) as the main constituent (first embodiment). The expression "as the main constituent" means that the content of the compound is preferably 90 to 100 mol %, more preferably 95 to 100 mol %, much more preferably 99 to 100 mol %.

Preferably, the polyester precursor contains 50 to 80 mol % of the compound represented by the formula (a-1) and 50 to 20 mol % of the compound represented by the formula (b-1) (second and third embodiments).

In the process disclosed by JP-A 60-135428 in which an ester of 6,6'-(ethylenedioxy)di-2-naphthoic acid (NEO-ester) and a glycol are reacted with each other, as the transesterification reaction proceeds, a phenomenon that the polyester precursor is gradually solidified by crystallization is seen, whereby stirring becomes difficult and it takes time to complete the transesterification reaction. Further, an accessory component such as dialkylene glycol is readily formed by raising the temperature to dissolve the solidified reaction product. The process of the present invention can solve these problems.

According to an embodiment of the present invention, in the first step, the compound represented by the formula (b-1) may be added to the polyester precursor obtained by esterifying mainly the compound represented by the formula (a).

(Second Step)

The second step is to polycondense the polyester precursor obtained in the first step in the presence of a polymerization catalyst.

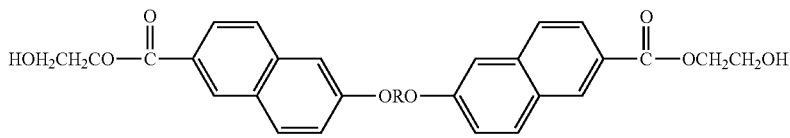

When the compound represented by the formula (b) is used as dicarboxylic acid, a compound represented by the following formula (b-1) is contained in the polyester precursor. In the formula, Ar is the same as in the formula (b).

The polycondensation catalyst is, for example, a metal compound containing at least one metal element. The polycondensation catalyst may also be used in the esterification reaction. Examples of the metal element include titanium, germanium, antimony, aluminum, nickel, zinc, tin, cobalt, rhodium, iridium, zirconium, hafnium, lithium, calcium and magnesium. Out of these, titanium, germanium, antimony, aluminum and tin are preferred, and a titanium compound is particularly preferred because it exhibits high activity in both the esterification reaction and the polycondensation reaction.

Preferred examples of the titanium compound as the polycondensation catalyst include tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanate, ammonium oxalate titanate, titanium oxide, orthoester or condensation orthoester of titanium, reaction product of an orthoester or condensation orthoester of titanium and hydroxycarboxylic acid, reaction product of an orthoester or condensation orthoester of titanium, hydroxycarboxylic acid and a phosphorus compound, and reaction product of a polyhydric alcohol having an orthoester or condensation orthoester of titanium and at least two hydroxyl groups and 2-hydroxycarboxylic acid or a base.

Examples of the antimony compound include antimony trioxide, antimony pentoxide, antimony acetate and antimony glycoxide. Examples of the germanium compound include germanium dioxide, germanium tetraoxide, germanium hydroxide, germanium oxalate, germanium tetraethoxide and germanium tetra-n-butoxide.

Examples of the aluminum compound include carboxylic acid salts such as aluminum formate, aluminum acetate, basic aluminum acetate, aluminum propionate, aluminum oxalate, aluminum acrylate, aluminum laurate, aluminum stearate, aluminum benzoate, aluminum trichloroacetate, aluminum lactate, aluminum tartarate, aluminum citrate and aluminum salicylate, inorganic acid salts such as aluminum chloride, aluminum hydroxide, aluminum hydroxide chloride, aluminum carbonate, aluminum phosphate and aluminum phosphonate, aluminum alkoxides such as aluminum methoxide, aluminum ethoxide, aluminum-n-propoxide, aluminum isopropoxide, aluminum-n-butoxide and aluminum-tert-butoxide, aluminum chelate compounds such as aluminum acetylacetonate, aluminum acetylacetate, aluminum ethyl acetoacetate and aluminum ethyl acetoacetate diisopropoxide, organic aluminum compounds such as trimethyl aluminum and triethyl aluminum, partial hydrolysates thereof, and aluminum oxide.

Out of these aluminum compounds, carboxylic acid salts, inorganic acid salts and chelate compounds are preferred, and basic aluminum acetate, aluminum lactate, aluminum chloride, aluminum hydroxide, aluminum hydroxide chloride and aluminum acetylacetonate are particularly preferred. The basic aluminum acetate which is stabilized with an additive such as boric acid may be used.

These catalysts may be used alone or in combination. The amount of the catalyst is preferably 0.005 to 0.5 mol % based on the polymer.

The preferred polycondensation temperature is preferably the melting point of the obtained polymer to 350° C., more preferably (melting point+5° C.) to 330° C. The polycondensation reaction is preferably carried out under a reduced pressure of 5 mmHg or less. When the pressure is higher than 5 mmHg, the time required for the polycondensation reaction becomes long and it is difficult to obtain a polyester having a high degree of polymerization.

The aromatic polyester obtained by the manufacturing process of the present invention has an intrinsic viscosity measured at 35° C. by using a mixed solvent of P-chlorophenol and 1,1,2,2-tetrachloroethane (weigh ratio of 40/60) of preferably 0.4 to 3.0, more preferably 0.4 to 1.5.

The aromatic polyester obtained by the manufacturing process of the present invention has a content of the recurring unit represented by the following formula (D) of less than 10 mol %.

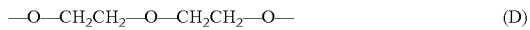

$$—O—CH_2CH_2—O—CH_2CH_2—O— \quad (D)$$

Preferably, the aromatic polyester has a terminal carboxyl group concentration of 200 eq/ton or less and an alkali metal content of 300 ppm or less.

(Solid-Phase Polymerization Step)

An aromatic polyester having a high degree of polymerization can be obtained by further carrying out the solid-phase polymerization of the obtained aromatic polyester. The aromatic polyester containing the recurring unit represented by the formula (A) of the present invention has a higher melt viscosity than polyethylene terephthalate, polyethylene naphthalate, polybutylene terephthalate and polytriethylene terephthalate. When the polymerization temperature is increased to reduce the melt viscosity, the thermal deterioration of the polymer chain readily occurs. When the melt viscosity is high, the diffusion speed of the by-product formed by the reaction slows down, thereby taking a long time to increase the degree of polymerization. It is not preferred that the degree of polymerization should be further raised only by melt polymerization. Therefore, the degree of polymerization is preferably increased to a desired value by solid-phase polymerization.

When the prepolymer obtained by melt polymerization is formed into a powder or chip and heated at a temperature lower than its melting point to be solid-phase polymerized, the degree of polymerization can be increased to a desired value efficiently. It is preferred that the prepolymer should be formed into a chip in order to suppress the production of a powder as much as possible. The solid-phase polymerization is preferably carried out under reduced pressure and/or an inert gas stream such as nitrogen, carbon dioxide or argon.

The intrinsic viscosity of the prepolymer is preferably 0.4 to 1.5 dl/g, more preferably 0.5 to 1.3 dl/g, much more preferably 0.6 to 1.0 dl/g. A prepolymer having an intrinsic viscosity of less than 0.4 dl/g is not preferred because a powder is produced by contact between chips or an impact. The solid-phase polymerization must be carried out for a long time. When the intrinsic viscosity of the prepolymer is higher than 1.5 dl/g, a special reactor is needed at the time of melt polymerization and huge stirring energy is required disadvantageously.

Optionally, prior to the solid-phase polycondensation, the prepolymer particles are preferably crystallized by heating in an inert gas atmosphere, steam gas atmosphere or steam-containing inert gas atmosphere. After this crystallization, the prepolymer particles are further heated at a high temperature so that the solid-phase polymerization can be carried out at a higher temperature. The solid-phase polymerization is preferably carried out until the intrinsic viscosity of the aromatic polyester becomes 0.7 to 3.0 dl/g. When the intrinsic viscosity is lower than 0.7 dl/g, the solid-phase polymerization is of little significance. When the intrinsic viscosity is too high, the melt viscosity becomes too high, thereby reducing moldability. Therefore, the solid-phase polycondensation is preferably carried out until the intrinsic viscosity of the obtained aromatic polyester becomes 1.0 to 2.5 dl/g, particularly 1.3 to 1.8 dl/g.

The aromatic polyester of the present invention may be optionally mixed with another thermoplastic polymer, stabilizer such as ultraviolet absorbent, antioxidant, plasticizer, lubricant, flame retardant, release agent, pigment, nucleating agent, filler or glass fiber, carbon fiber or lamellar silicate. Examples of the another thermoplastic polymer include polyester-based resins different from the above aromatic polyesters in composition, such as polyethylene terephthalate and polybutylene terephthalate, polyamide-based resin, polycarbonate, ABS resin, polymethyl methacrylate, polyamide-based elastomer and polyester-based elastomer. A resin composition prepared by mixing another thermoplastic resin with the aromatic polyester of the present invention can be molded into various products by extrusion molding, injection molding, extrusion blow molding or calender molding. The solid-phase polymerization of the obtained aromatic polyester pellet may be optionally carried out to achieve a higher intrinsic viscosity.

(Molding)

The aromatic polyester of the present invention can be subjected to ordinary melt molding such as extrusion molding, injection molding, compression molding or blow molding to obtain a fiber, film, 3-D molded article, vessel, hose, etc.

(Fiber)

The fiber can be manufactured by melt spinning the aromatic polyester of the present invention, stretching it at a temperature from its glass transition point to its melting point and preferably further heating it. The obtained fiber has excellent mechanical properties with an extremely high Young's modulus as well as excellent chemical and thermal properties such as heat resistance and hydrolysis resistance.

(Film)

The film can be manufactured by melting the aromatic polyester of the present invention, forming it into a film, stretching it at least in a monoaxial direction at a temperature from its glass transition point to its melting point and preferably further heating it.

The obtained film has excellent mechanical properties with an extremely high Young's modulus as well as excellent chemical and thermal properties such as heat resistance and hydrolysis resistance. It is also excellent in gas barrier properties (oxygen and steam).

When the aromatic polyester (2) or (3) of the present invention comprises the crystalline recurring unit represented by the formula (A) as the main component and the recurring unit represented by the formula (B-1) or (B-2) as a comonomer, it is excellent in stretchability or biaxial stretchability at the time of forming a film.

A biaxially oriented film obtained from the aromatic polyester (2) or (3) of the present invention has excellent dimensional stability while it maintains the excellent heat resistance and mechanical properties of polyethylene terephthalate or polyethylene naphthalene dicarboxylate. It is possible to reduce the humidity expansion coefficient in particular. Therefore, the aromatic polyester (2) or (3) is extremely preferred as a material for the base film of a high-density magnetic recording medium.

The biaxially oriented film is obtained by stretching in a film forming direction (MD direction) and a transverse direction (TD direction) to enhance molecular orientation in these directions. It can be manufactured, for example, by the following process.

After the aromatic polyester (2) or (3) is dried, it is supplied into an extruder heated at a temperature from its melting point (Tm) to (Tm+50)° C. to be extruded into a sheet form from a die such as a T die. This extruded sheet form is quenched to be solidified with a rotating cooling drum to obtain an unstretched film which is then biaxially stretched. Biaxial stretching may be either sequential biaxial stretching or simultaneous biaxial stretching.

In this text, a manufacturing process in which sequential biaxial stretching is carried out by stretching in a longitudinal direction and a transverse direction and heat setting in this order will be described as an example. Preferably, the film is first stretched to 3 to 8 times in the longitudinal direction at a temperature from the glass transition temperature (Tg) of the aromatic polyester to (Tg+40)° C. and then to 3 to 8 times in the transverse direction at a temperature from (Tg+10) to (Tg+50)° C. which is higher than the temperature for the previous longitudinal stretching and further heat set at a temperature lower than the melting point of the polymer and from (Tg+50) to (Tg+150)° C. for 1 to 20 seconds and further for 1 to 15 seconds.

EXAMPLES

The following examples and comparative examples are provided to further illustrate the present invention. The physical properties were measured by the following methods.

(1) Intrinsic Viscosity

The intrinsic viscosity of the aromatic polyester was measured at 35° C. by dissolving a sample into a mixed solvent of P-chlorophenol and tetrachloroethane (weight ratio of 40/60) to prepare a sample solution having a sample concentration of 0.5 g/dL.

(2) Glass Transition Point and Melting Point

The glass transition point and the melting point were measured by DSC (DSC2920 of TA Instrument Co., Ltd.) at a temperature elevation rate of 20° C./min. For the evaluation of liquid crystallinity, when the sample was heated up to 320° C. at a temperature elevation rate of 20° C./min and then cooled at a rate of 10° C./min, a heat absorption peak was observed.

(3) Terminal Carboxyl Group Concentration

The terminal carboxyl group concentration was measured by 600 MHz $^1$H-NMR (JEOL A-600 of JEOL Ltd.).

(4) Esterification Rate

The esterification rate was obtained from the following equation by measuring the number of carboxyl groups of the aromatic polyester by 600 MHz $^1$H-NMR (JEOL A-600 of JEOL Ltd.).

Esterification rate(%)=number of esterified carboxyl groups/number of all carboxyl groups before esterification×100

(5) Method of Measuring the Content of Diethylene Glycol Component Represented by Formula (D)

The content of diethylene glycol was measured by 600 MHz $^1$H-NMR (JEOL A-600 of JEOL Ltd.).

(6) Amount of Comonomer

The amount of the comonomer was measured by 600 MHz 1H-NMR (JEOL A-600 of JEOL Ltd.).

(7) Alkali Metal Content

The alkali metal content was measured as the total weight of metal sodium and metal potassium based on the weight of the resin composition by using the Z5000 polarization Zeeman atomic absorptiometer of HITACHI SEISAKUSHO K.K.

(8) XRD Measurement

The RAD-B powder X-ray diffraction apparatus of Rigaku Co., Ltd. was used for the XRD measurement. An amorphous sample obtained by melting the sample at 340° C. and quenching it in an iced bath was measured to calculate its Q value from the following equation (I).

$$Q = Lp/Ap \qquad (I)$$

Lp: peak observed at a 2θ of 7.5 to 9.0°
Ap: peak observed at a 2θ of 20 to 21°

(9) Young's Modulus

The obtained aromatic polyester was molten at a temperature of (melting point+20)° C. and extruded onto a cooling drum as an unstretched sheet having a thickness of 600 μm which was then stretched to 3.4 times between rolls in a film forming direction at 140° C. Thereafter, the obtained film was cut to a width of 10 mm and a length of 15 cm, and the obtained sample was pulled at a chuck interval of 100 mm, a tensile speed of 10 mm/min and a chart rate of 500 mm/min by a universal tensile tester (manufactured by Toyo Baldwin Co., Ltd., trade name: Tensilon). The measurement direction of the Young's modulus is a film forming direction. The Young's modulus was calculated from the tangent of a rising portion of the obtained load-elongation curve.

(10) Temperature Expansion Coefficient (αt)

The obtained film was cut to a length of 15 mm and a width of 5 mm to ensure that the width direction of the film became the measurement direction, and the obtained film sample was set in the TMA3000 of Shinku Riko Co., Ltd. and pre-treated in a nitrogen atmosphere (0% RH) at 60° C. for 30 minutes and then cooled to room temperature. Thereafter, it was heated from 25° C. to 70° C. at a rate of 2° C./min to measure the length of the sample at each temperature and calculate its temperature expansion coefficient (at) from the following equation. The measurement direction was the longitudinal direction of the sample, and the measurement was made 5 times to obtain an average value.

$$\alpha t = \{(L_{60} - L_{40})/(L_{40} \times \Delta T)\} + 0.5$$

In the above equation, $L_{40}$ is the length (mm) of the sample at 40° C., $L_{60}$ is the length (mm) of the sample at 60° C., ΔT is 20 (=60-40)° C., and 0.5 is the temperature expansion coefficient (ppm/° C.) of quartz glass.

(11) Humidity Expansion Coefficient (αh)

The obtained film was cut to a length of 15 mm and a width of 5 mm to ensure that the width direction of the film became the measurement direction, and the obtained sample was set in the TMA3000 of Shinku Riko Co., Ltd. to measure its length in a 30° C. nitrogen atmosphere at a humidity of 30% RH and 70% RH so as to calculate its humidity expansion coefficient from the following equation. The measurement direction was the longitudinal direction of the sample, and the measurement was made 5 times to obtain an average value αh.

$$\alpha h = (L_{70} - L_{30})/(L_{30} \times \Delta H)$$

In the above formula, $L_{30}$ is the length (mm) of the sample at 30% RH, $L_{70}$ is the length (mm) of the sample at 70% RH, and ΔH is 40 (=70-30) % RH.

(12) Steam Barrier Properties

Steam permeability in a 40° C. and 90% RH atmosphere was measured by using the Permatran W1A of MOCON Co., Ltd.

(13) Oxygen Barrier Properties

Oxygen permeability in a 23° C. and 0% RH atmosphere and a 40° C. and 90% RH atmosphere was measured by using the Oxitran 2/20ML of MOCON Co., Ltd.

Reference Example 1

Manufacture of 6,6'-(Ethylenedioxy)Di-2-Naphthoic Acid (NEO-H)

1,000 parts by weight of 2-hydroxy-6-naphthoic acid, 597 parts by weight of potassium hydroxide, 263 parts by weight of dichloroethane and 5,000 parts by weight of water were fed to a 10-liter autoclave equipped with a stirrer, the inside of the autoclave was substituted by nitrogen, and a nitrogen pressure of 0.3 MPa was applied to carry out a reaction at 120 to 130° C. under agitation. After the reaction, the reaction solution was cooled and filtered to obtain a solid comprising a monopotassium salt of 6,6'-(ethylenedioxy)di-2-naphthoic acid as the main component. The dry weight of this product was 380 parts by weight. This product was fed to a 5-liter separable flask, and 46 parts by weight of potassium hydroxide and 5,400 parts by weight of water were added to the flask and heated at 95° C. When the salt was completely dissolved, sulfuric acid was added to carry out acid deposition at 95° C. for 6 hours. A solid which separated out after acid deposition was filtered, rinsed and dried under reduced pressure. The dry weight of the solid after drying was 290 parts by weight. The residual alkali content of the obtained crude 6,6-(ethylenedioxy)-di-2-naphthoic acid was 2 wt %.

400 parts by weight of the obtained crude 6,6-(ethylenedioxy)-di-2-naphthoic acid, 403 parts by weight of triethylamine and 4,000 parts by weight of water were well mixed together, and the resulting mixture was separated by filtration with a filter having an opening diameter of 1 μm to obtain a clear triethylamine salt aqueous solution of 6,6'-(ethylenedioxy)-di-2-naphthoic acid. 36% hydrochloric acid was added to this solution to carry out acid deposition. The precipitated 6,6-(ethylenedioxy)-di-2-naphthoic acid was separated by filtration, and 5,000 parts by weight of water was added and stirred for 30 minutes to clean the precipitated product. This operation was carried out 3 times. Thereafter, 5,000 parts by weight of methanol was added, stirred and mixed to further clean the product, and the cleaned product was separated by filtration and dried to obtain 6,6-(ethylenedioxy)-di-2-naphthoic acid (NEO-H). The residual potassium content of NEO-H was 12 ppm.

Example 1

First Step 100 parts by weight of NEO-H obtained in Reference Example 1, 62 parts by weight of ethylene glycol and 0.085 part by weight of tetra-n-butyl titanate were fed to a 1-liter autoclave equipped with a stirrer and a nitrogen gas introduction port, the inside of the autoclave was substituted by nitrogen, and a nitrogen pressure of 0.2 MPa was applied to carry out a reaction at 230° C. for 6 hours. After the reaction, the precipitated crystal was filtered and cleaned with methanol. After cleaning, the crystal was vacuum dried at 120° C. to obtain 115 parts by weight of a polyester precursor containing bis(β-hydroxyethyl)6,6'-(ethylenedioxy)di-2-naphthoic acid (NEO-EG). The esterification rate of this polyester precursor was 96%. Its melting point was 240° C.

Second Step 100 parts by weight of the polyester precursor obtained in the first step and 0.0347 part by weight of tetra-n-butyl titanate were fed to a reactor equipped with a fractionating column to be molten at 270° C. in a nitrogen atmosphere. Thereafter, the pressure was gradually reduced, a reaction was carried out under agitation at 500 mHg for 20 minutes, and the temperature was raised to 320° C. The inside pressure of the system was gradually reduced, and the reaction was further carried out under agitation for about 20 minutes after the pressure reached 0.2 mmHg. The obtained aromatic polyester had an intrinsic viscosity of 1.47, a glass transition temperature of 132° C. and a melting point of 300° C. The diethylene glycol content of the aromatic polyester was 5.0 mol %. It had a terminal carboxyl group concentration of 55 eq/ton. It had an alkali metal content of 27 ppm.

Example 2

100 parts by weight of the polyester precursor obtained in the first step of Example 1, 27 parts by weight of 2,6-bis(hydroxyethoxycarbonyl)naphthalene and 0.02 part by weight of tetra-n-butyl titanate were fed to a reactor equipped with a fractionating column to be molten at 270° C. in a nitrogen atmosphere. Thereafter, the pressure was gradually reduced, a reaction was carried out under agitation at 500 mmHg for about 20 minutes, and the temperature was raised to 320° C. The inside pressure of the system was further gradually reduced, and the reaction was further carried out under agitation for about 20 minutes after the pressure reached 0.2 mmHg to obtain an aromatic polyester. The obtained aromatic polyester had an intrinsic viscosity of 1.6, a glass transition temperature of 121° C. and a melting point of 287° C. The diethylene glycol content of the aromatic polyester was 6.0 mol %. It had a terminal carboxyl group concentration of 92 eq/ton. It had an alkali metal content of 20 ppm.

Example 3

100 parts by weight of the polyester precursor obtained in the first step of Example 1, 9.2 parts by weight of bis(hydroxyethyl)terephthalate and 0.04 part by weight of tetra-n-butyl titanate were fed to a reactor equipped with a fractionating column to be molten at 270° C. in a nitrogen atmosphere. Thereafter, the pressure was gradually reduced, a reaction was carried out under agitation at 500 mmHg for about 20 minutes, and the polymerization temperature was raised to 320° C. The inside pressure of the system was further gradually reduced, and the reaction was further carried out under agitation for about 20 minutes after the pressure reached 0.2 mmHg to obtain an aromatic polyester. The obtained aromatic polyester had an intrinsic viscosity of 1.4, a glass transition temperature of 120° C. and a melting point of 282° C. The diethylene glycol content of the aromatic polyester was 7.2 mol %. It had a terminal carboxyl group concentration of 80 eq/ton. It had an alkali metal content of 23 ppm.

Example 4

Second Step 100 parts by weight of the polyester precursor obtained in the first step of Example 1 and 0.0347 part by weight of tetra-n-butyl titanate were fed to a reactor equipped with a fractionating column to be molten at 270° C. in a nitrogen atmosphere. Thereafter, the pressure was gradually reduced, a reaction was carried out under agitation at 500 mmHg for about 20 minutes, and the polymerization temperature was raised to 320° C. The inside pressure of the system was further gradually reduced, and the reaction was further carried out under agitation for about 30 minutes after the pressure reached 30 mmHg to obtain a prepolymer. The obtained prepolymer had an intrinsic viscosity of 0.72.

Solid-Phase Polymerization Step

This prepolymer was ground to obtain powders having a size of 1 to 2 mm, the obtained powders were fed to a reactor equipped with a stirrer, and solid-phase polymerization was carried out at 280° C. under a reduced pressure of 0.2 mmHg for 15 hours to obtain an aromatic polyester. The obtained aromatic polyester had an intrinsic viscosity of 2.0.

Example 5

The prepolymer obtained in the second step of Example 4 was molten at 320° C. by a kneader and formed into chips. The chips had a diameter of 1.2 to 1.5 mm and a length of 3.2 to 3.7 mm. The chips were fed to a cylindrical reactor having an inert gas ejection port in a lower portion, and solid-phase polymerization was carried out at 280° C. while a nitrogen gas was circulated at a rate of 0.8 NL/cm$^2$ min. The intrinsic viscosity of the aromatic polyester obtained after 15 hours was 2.2. The aromatic polyester had a diethylene glycol content of 7.0 mol %, a terminal carboxyl group concentration of 40 eq/ton and an alkali metal content of 25 ppm Comparative Example 1

A polymer of the same type as in Example 1 was synthesized in the same manner as in JP-A 60-135428. Stated more specifically, 458 parts by weight of diethyl 6,6'-(ethylenedioxy)di-2-naphthoate (NEO-ester), 130 parts by weight of ethylene glycol and 0.1 part by weight of tetra-n-butyl titanate were fed and heated at 200 to 260° C., and ethanol formed by a reaction was distilled out to the outside of the system. The reaction product gradually crystallized and solidified. Stirring was suspended, the temperature was raised to 290° C. to melt the reaction product after a theoretical amount of ethanol distillated out, the product was further reacted at normal pressure in a nitrogen gas stream for 30 minutes, the reaction temperature was then raised to 310° C., the inside pressure of the system was gradually reduced, and the reaction was further carried out for 10 minutes after the pressure reached 0.2 mmHg. The obtained polymer had a melting point of 294° C., a diethylene glycol content of 12 mol %, a terminal carboxyl group concentration of 105 eq/ton and an alkali metal content of 30 ppm.

When a transesterification reaction was carried out in the same manner as in JP-A 60-135428, the aromatic polyester precursor crystals were precipitated and solidified in the latter stage of the reaction, thereby causing a problem in the stirring step. As a result, the transesterification reaction did not proceed completely. The manufactured aromatic polyester contained a large amount of the residual glycol component, and it was thereby confirmed that the thermal properties of the aromatic polyester were impaired.

Comparative Example 2

Polycondensation was carried out in the same manner as in Example 1 by using a polyester precursor having an esterification rate of 77%. The obtained polymer had a melting point of 292° C., which means that the thermal properties of the polymer deteriorated. It had a diethylene glycol content of 14 mol %.

Example 6

Second Step 100 parts by weight of the polyester precursor obtained in the first step of Example 1, 52 parts by weight of bis-2-dihydroxyethyl terephthalate and 0.03 part by weight of tetra-n-butyl titanate were fed to a reactor equipped with a fractionating column to be molten at 270° C. in a nitrogen atmosphere. After the pressure was gradually reduced and a reaction was carried out under agitation at 500 mmHg for about 20 minutes, the polymerization temperature was raised to 320° C. Then, the inside pressure of the system was further gradually reduced, and the reaction was further carried out under agitation for about 20 minutes after the pressure reached 0.2 mmHg to obtain an aromatic polyester having a NEO-H content of 50 mol % and a terephthalic acid content of 50 mol %. The obtained aromatic polyester had an intrinsic viscosity of 1.02, a glass transition temperature of 104° C. and a melting point of 234° C. The physical properties of the obtained aromatic polyester are shown in Table 1.

No peak was seen in the XRD measurement of the obtained aromatic polyester.

When the obtained aromatic polyester was heated up to 320° C. at a temperature elevation rate of 20° C./min and then cooled at a rate of 10° C./min in the DSC measurement, a heat absorption peak was seen at 159° C. and 197° C. (FIG. 1).

Example 7

An aromatic polyester having a NEO-H content of 70 mol % and a terephthalic acid content of 30 mol % was obtained in the same manner as in Example 6 except that 100 parts by weight of the polyester precursor obtained in the first step of Example 1 and 23 parts by weight of bis-2-dihydroxyethyl terephthalate were used. The characteristic properties of the obtained aromatic polyester are shown in Table 1.

Figure 2:
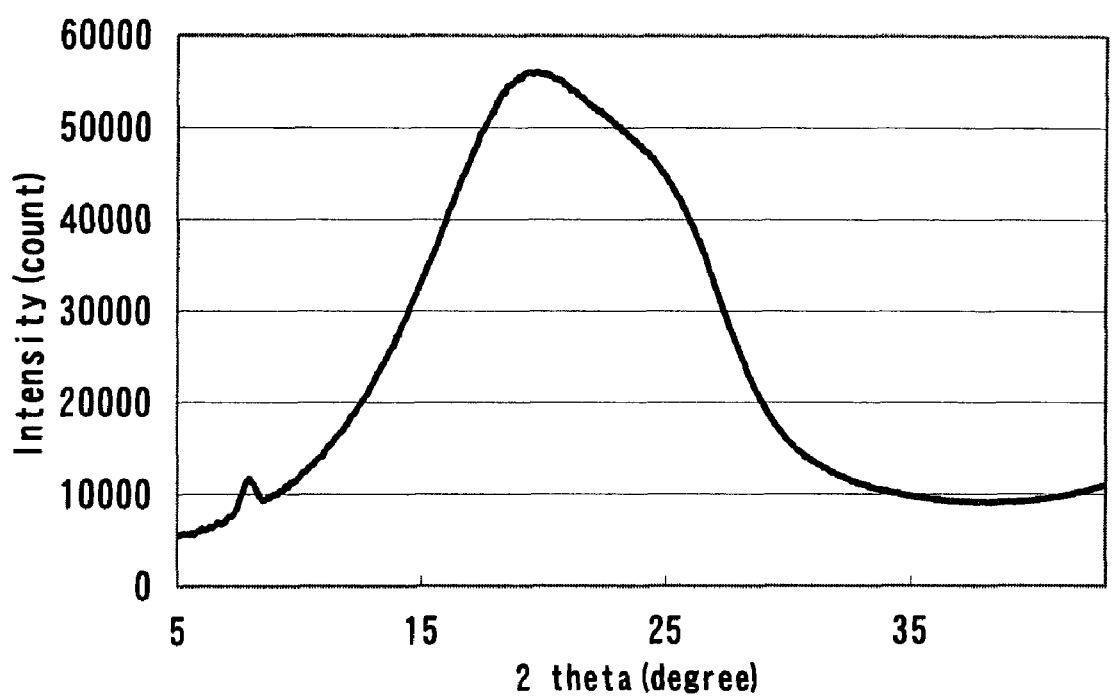
FIG. 2 is an XRD measurement chart of the aromatic polyester of Example 7.

Peak Ap was seen at a 2θ of 20 to 21° and peak Lp was seen at a 2θ of 7.5 to 9.0° in the XRD measurement of the obtained aromatic polyester (FIG. 2). The intensity of Ap was 49324, the intensity of Lp was 3245, and the Q value was 0.062.

Figure 3:
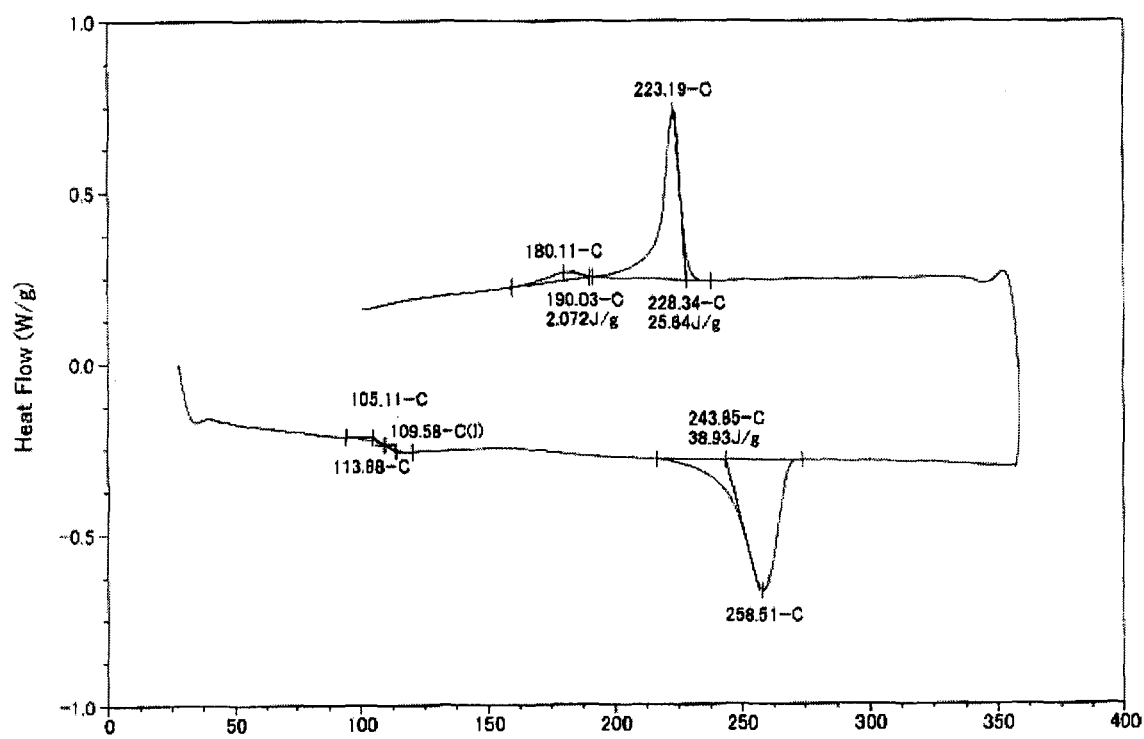
FIG. 3 is a DSC measurement chart of the aromatic polyester of Example 7.

A heat absorption peak was seen at 180° C. and 223° C. when the obtained aromatic polyester was heated up to 320° C. at a temperature elevation rate of 20° C./min and then cooled at a rate of 10° C./min in the DSC measurement (FIG. 3).

TABLE 1

| | | DSC | | NMR | | |
| --- | --- | --- | --- | --- | --- | --- |
| | | | | amount of COOH | amount of OH | |
| | $\eta_{sp}/c$ | Tg (° C.) | Tm (° C.) | terminal (eq/Ton) | terminal (eq/Ton) | DEG mol % |
| Example 6 | 1.02 | 104 | 234 | 0.1 | 36.2 | 7.0 |
| Example 7 | 0.88 | 110 | 259 | 10.1 | 73.9 | 7.8 |

Example 8

The aromatic polyester obtained in Example 7 was supplied into an extruder and extruded onto a rotating cooling drum having a temperature of 40° C. from a die into a sheet form while it was molten at 300° C. to obtain an unstretched film. The unstretched film was then heated between two rollers which differed in revolution with an IR heater from above in the film forming direction to ensure that the surface temperature of the film became 135° C. so as to be stretched to 2 times in the longitudinal direction (film forming direction) and then to 3.8 times in the transverse direction (width direction) at 140° C. to obtain a film having a thickness of 18.4 μm which was then heat set at 200° C. for 10 seconds. The physical properties of the obtained biaxially oriented film are shown in Table 2.

TABLE 2

| Young's modulus (MD) | GPa | 306 |
| --- | --- | --- |
| Young's modulus (TD) | GPa | 837 |
| αt (TD) | ×10⁻⁶/% RH | −2.2 |
| αh (TD) | ×10⁻⁶/° C. | 6.6 |
| Gas barrier properties | cc · 100 μm/m²/day | 2.4 |

Example 9

100 parts by weight of the polyester precursor obtained in the first step of Example 1, 62 parts by weight of 2,6-bis(hydroxyethoxycarbonyl)naphthalene and 0.03 part by weight of tetra-n-butyl titanate were fed to a reactor equipped with a fractionating column to be molten at 270° C. in a nitrogen atmosphere. After the pressure was gradually reduced and a reaction was carried out under agitation at 500 mmHg for about 20 minutes, the polymerization temperature was raised to 320° C. Then, the inside pressure of the system was further gradually reduced, and the reaction was further carried out under agitation for about 20 minutes after the pressure reached 0.2 mmHg to obtain an aromatic polyester having a NEO-H content of 50 mol % and a 2,6-naphthalenedicarboxylic acid content of 50 mol %. The obtained aromatic polyester had an intrinsic viscosity of 0.93, a glass transition temperature of 109.75° C. and a melting point of 242.69° C. The physical properties of the obtained aromatic polyester are shown in Table 3.

Figure 4:
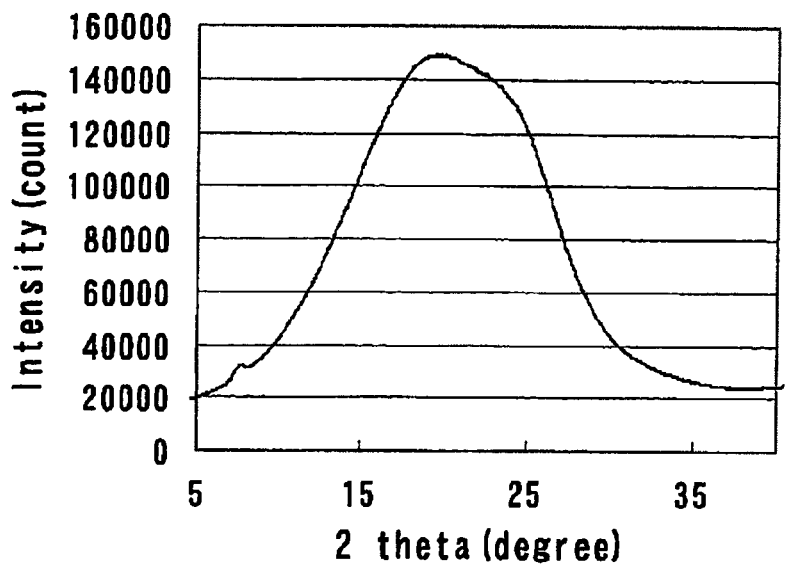
FIG. 4 is an XRD measurement chart of the aromatic polyester of Example 9.

Peak Ap was seen at a 2θ of 20 to 21° and peak Lp was seen at a 2θ of 7.5 to 9.0° in the XRD measurement of the obtained aromatic polyester (FIG. 4). The Q value obtained from the following equation (I) was 0.027.

$$Q = Lp/Ap \quad (I)$$

Figure 5:
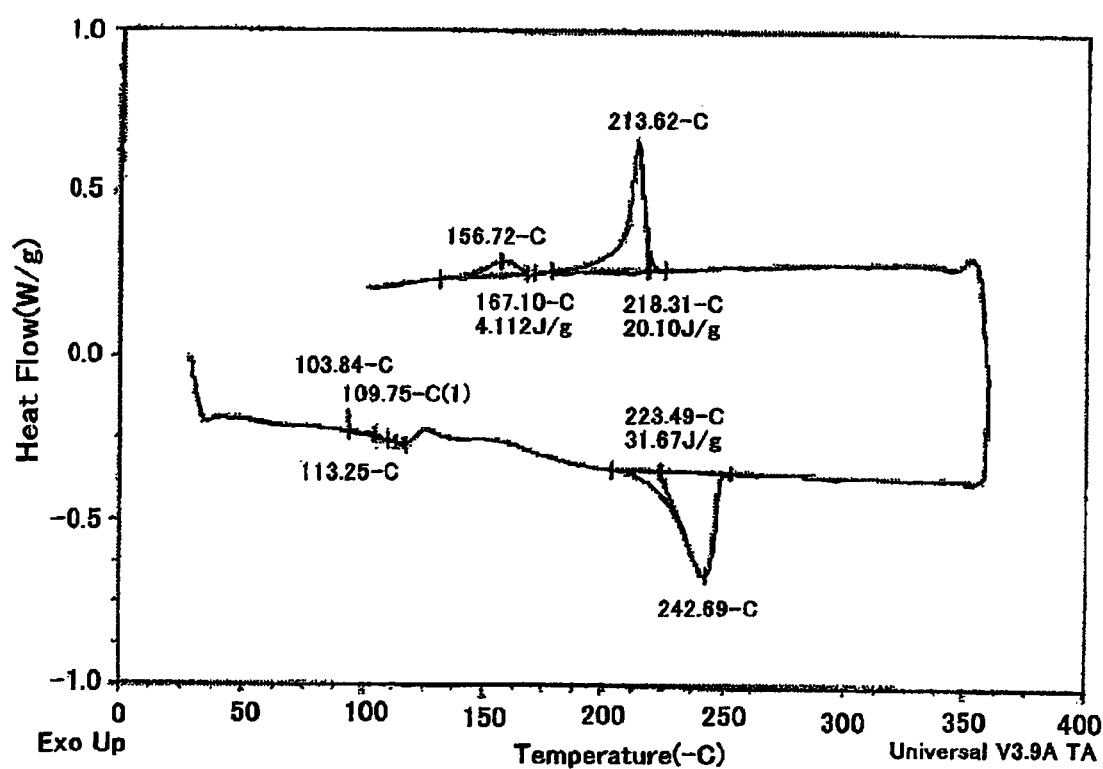
FIG. 5 is a DSC measurement chart of the aromatic polyester of Example 9.

A heat absorption peak was seen at 157° C. and 214° C. when the obtained aromatic polyester was heated up to 320° C. at a temperature elevation rate of 20° C./min and then cooled at a rate of 10° C./min in the DSC measurement (FIG. 5).

Example 10

An aromatic polyester having a NEO-H content of 70.7 mol % and a naphthalenedicarboxylic acid content of 29.3 mol % was obtained in the same manner as in Example 9 except that 100 parts by weight of the polyester precursor obtained in the first step of Example 1 and 27 parts by weight of 2,6-bis(hydroxyethoxycarbonyl)naphthalene were used. The physical properties of the obtained aromatic polyester are shown in Table 3.

Figure 6:
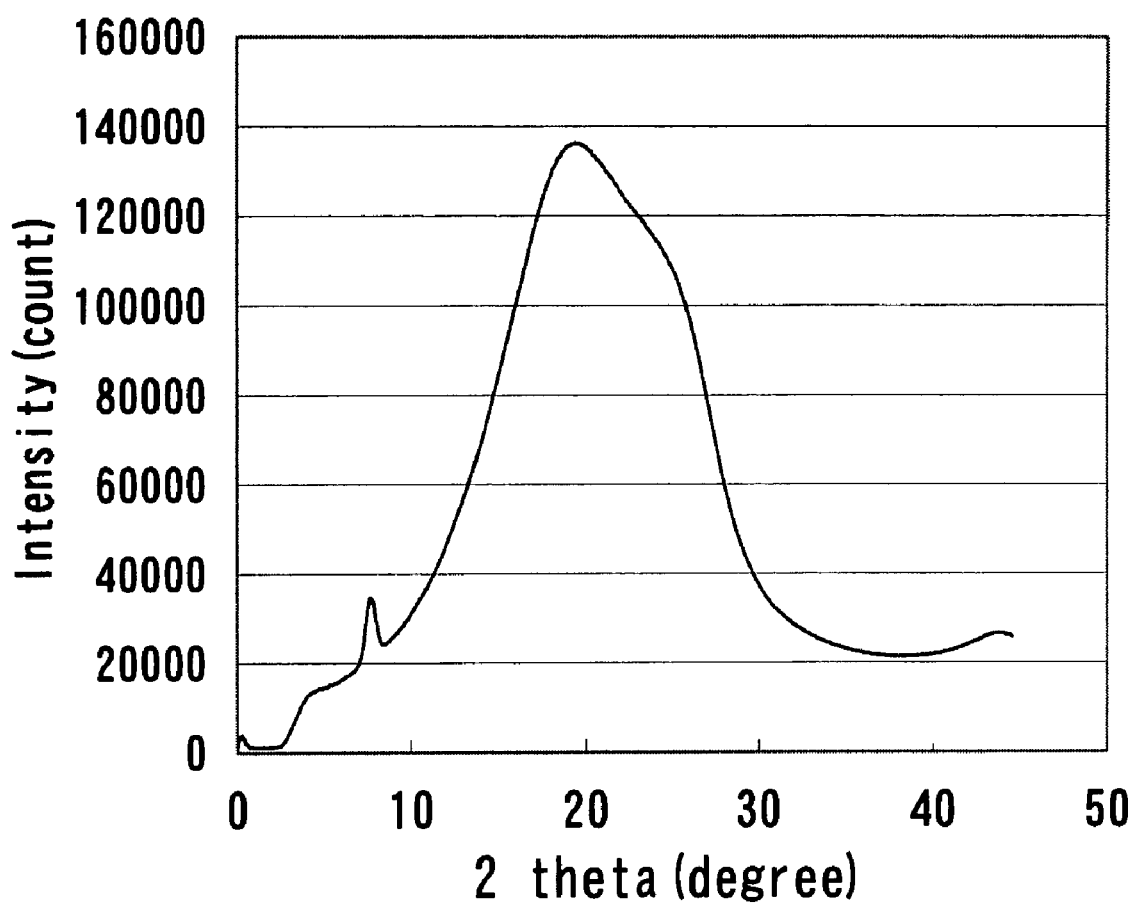
FIG. 6 is an XRD measurement chart of the aromatic polyester of Example 10.

Peak Ap was seen at a 2θ of 20 to 21° and peak Lp was seen at a 2θ of 7.5 to 9.0° in the XRD measurement of the obtained aromatic polyester (FIG. 6). The Q value obtained from the equation (I) was 0.1.

Figure 7:
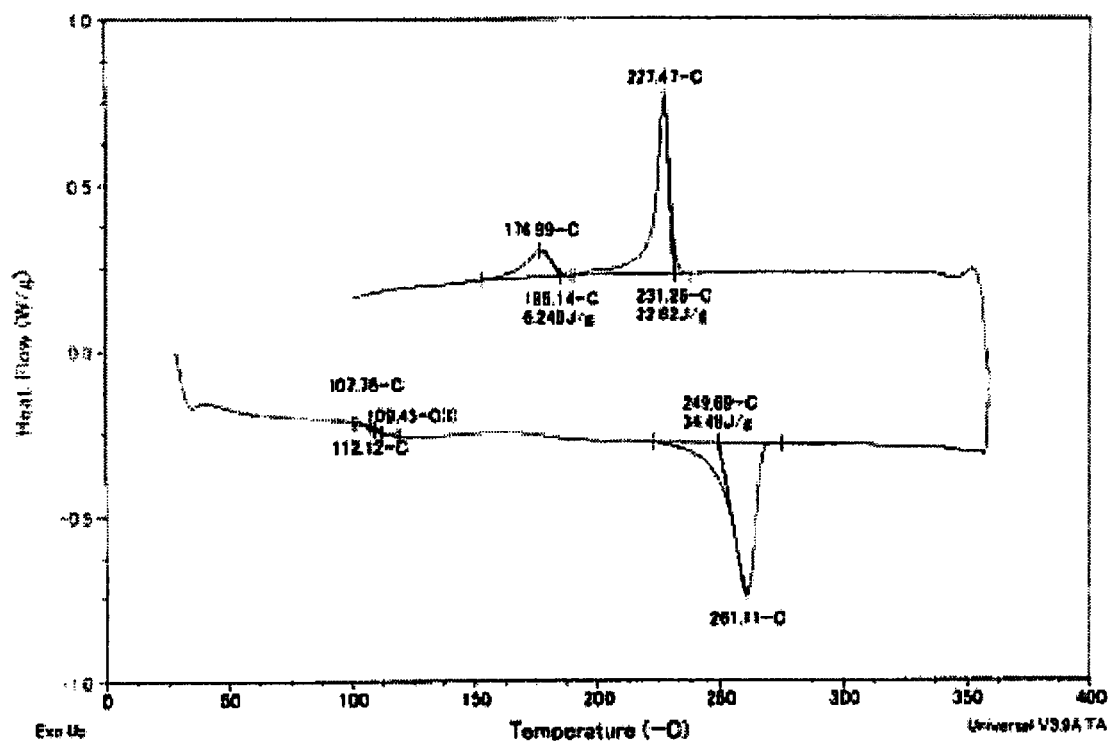
FIG. 7 is a DSC measurement chart of the aromatic polyester of Example 10.

A heat absorption peak was seen at 177° C. and 227° C. when the obtained aromatic polyester was heated up to 320° C. at a temperature elevation rate of 20° C./min and then cooled at a rate of 10° C./min in the DSC measurement (FIG. 7).

mer was stretched at draw ratios shown in Table 4 in the same manner as in Example 11 to obtain a biaxially oriented polyester film.

The characteristic properties of the obtained biaxially oriented polyester film are shown in Table 4.

TABLE 4

|  |  | Ex. 11 | Ex. 12 | Ex. 13 | C. Ex. 13 | | |
|---|---|---|---|---|---|---|---|
| Thickness | μm | 12.3 | 10.5 | 9.2 | 8-10 | | |
| Longitudinal draw ratio | times | 3.0 | 3.5 | 4.0 | 3.2 | 3.0 | 3.5 |
| Transverse draw ratio | times | 3.8 | 3.8 | 3.8 | 3.8 | 3.4 | 2.9 |
| Maximum transverse draw ratio | times | 4.8 | 4.6 | 4.2 | 4.9 | 4.4 | 3.3 |
| Area draw ratio |  | 11.4 | 13.3 | 15.2 | 12.2 | 10.2 | 10.2 |
| Young's modulus (MD) | GPa | 409 | 442 | 493 | 546 | 551 | 679 |
| Young's modulus (TD) | GPa | 601 | 540 | 533 | 858 | 676 | 599 |
| αt (TD) | ×10$^{-6}$/% RH | 11.9 | 14.3 | 10.5 | 0.03 | 4.4 | 8.22 |
| αh (TD) | ×10$^{-6}$/° C. | 6.4 | 6.2 | 5.5 | 9.4 | 10.4 | 12.0 |

Ex.: Example
C. Ex.: Comparative Example

TABLE 3

|  |  | DSC | | NMR | | |
|---|---|---|---|---|---|---|
|  |  |  |  | amount of COOH | amount of | |
|  | $\eta_{sp}/c$ | Tg (° C.) | Tm (° C.) | terminal (eq/Ton) | OH terminal (eq/Ton) | DEG mol % |
| Ex. 9 | 0.93 | 109.75 | 242.69 | 51.5 | 43.2 | 6.0 |
| Ex. 10 | 1.56 | 109.45 | 261.1 | 36.8 | 21.6 | 7.5 |

Ex.: Example

Examples 11 to 13

The aromatic polyester obtained in Example 10 was supplied into an extruder and extruded onto a rotating cooling drum having a temperature of 40° C. from a die into a sheet form while it was molten at 300° C. to obtain an unstretched film. The unstretched film was then heated between two rollers which differed in revolution with an IR heater from above in the film forming direction to ensure that the surface temperature of the film became 135° C. so as to be stretched at a draw ratio shown in Table 1 in the longitudinal direction (film forming direction) and then at a draw ratio shown in Table 4 in the transverse direction (width direction) at 140° C. to obtain a film having a thickness shown in Table 4 which was then heat set at 200° C. for 10 seconds. The physical properties of the obtained biaxially oriented films are shown in Table 4.

Comparative Example 3

An esterification reaction and a transesterification reaction were carried out in the presence of titanium tetrabutoxide, and a polycondensation reaction was subsequently carried out on dimethyl 2,6-naphthalenedicarboxylate and ethylene glycol to obtain polyethylene-2,6-naphthalate having an intrinsic viscosity of 0.62 dl/g and containing a glycol component having a diethylene glycol content of 1.5 mol %. This polymer was stretched at draw ratios shown in Table 4 in the same manner as in Example 11 to obtain a biaxially oriented polyester film.

Example 14

An aromatic polyester having a NEO-H content of 85 mol % and a naphthalenedicarboxylic acid content of 15 mol % was obtained in the same manner as in Example 9 except that 100 parts by weight of the polyester precursor obtained in the first step of Example 1 and 11 parts by weight of 2,6-bis(hydroxyethoxycarbonyl)naphthalene were used. The aromatic polyester was stretched to 3 times in the longitudinal direction and to 3 times in the transverse direction in a 150° C. atmosphere by a simultaneous biaxial stretching apparatus and heat set at 210° C. to obtain a film having a thickness of 10.8 μm and measure its gas barrier properties. The results are shown in Table 5.

Reference Example

The gas barrier properties of films manufactured by Teijin DuPont Film Co., Ltd. (registered trademark: Tetron (O3-125)) and (registered trademark: Teonex (Q65-125)) were measured in the same manner as described above. The results are shown in Table 5.

TABLE 5

|  |  | Film | | |
|---|---|---|---|---|
|  |  | Ex. 14 | Q65-125 | O3-125 |
| Thickness (μm) |  | 10.8 | 100 | 100 |
| Oxygen permeation constant (cc · μm/m$^2$/day) | 23° C. 0% RH | 195.5 | — | — |
| Oxygen permeability when film thickness is 100 μm (cc · 100 μm/m$^2$/day) | 23° C. 0% RH | 2.0 | — | — |
| Oxygen permeation constant (cc · μm/m$^2$/day) | 40° C. 90% RH | 324 | — | — |
| Oxygen permeability when film thickness is 100 μm (cc · 100 μm/m$^2$/day) | 40° C. 90% RH | 3.2 | 4 | 18 |
| Steam permeation constant (g · μm/m$^2$/day) | 40° C. 100% RH | 159.8 | — | — |

TABLE 5-continued

|  |  | Film | | |
|---|---|---|---|---|
|  |  | Ex. 14 | Q65-125 | O3-125 |
| Steam permeability when film thickness is 100 μm (g · 100 μm/m²/day) | 40° C. 100% RH | 1.6 | 3 | 9 |

Ex.: Example

Example 15

The aromatic polyester obtained in Example 1 was supplied into an extruder and extruded onto a rotating cooling drum having a temperature of 40° C. from a die into a sheet form while it was molten at 340° C. to obtain an unstretched film. The obtained unstretched film was then stretched to 3.0 times in both longitudinal and transverse directions simultaneously at 155° C. to obtain a film having a thickness of 12 μm. Thereafter, the film was heat set at 260° C. for 60 seconds. The characteristic properties of the obtained biaxially oriented polyester film are shown in Table 6.

TABLE 6

| αt (TD) | ×10⁻⁶/% RH | 1.0 |
|---|---|---|
| αh (TD) | ×10⁻⁶/° C. | 7.8 |
| Gas barrier properties | cc · 100 μm/m²/day | 2.7 |

The compositions and physical properties of the obtained aromatic polyesters obtained in Examples 1 to 7 and to 10 and Comparative Examples 1 and 2 are shown in Table 7.

EFFECT OF THE INVENTION

The aromatic polyester of the present invention has excellent heat resistance due to its low content of a diethylene glycol component represented by the formula (D). The aromatic polyester of the present invention has excellent hydrolysis resistance due to its low terminal carboxyl group concentration. The aromatic polyester of the present invention has a good color due to its low alkali metal content. The film of the present invention is excellent in mechanical properties, dimensional stability and gas barrier properties.

According to the manufacturing process of the present invention, 6,6'-(ethylenedioxy)di-2-naphthoic acid (NEO-H) can be used in an acid form and an aromatic polyester can be manufactured at a low cost without using an ester of 6,6'-(ethylenedioxy)di-2-naphthoic acid (NEO-ester) which is difficult to be purified as a dicarboxylic acid component which is one of the raw materials. According to the manufacturing process of the present invention, since a highly esterified polyester precursor is obtained and then polycondensed, an aromatic polyester having a high intrinsic viscosity is obtained. An aromatic polyester having excellent heat resistance due to its low content of the diethylene glycol component represented by the formula (D) is obtained. An aromatic polyester having a low terminal carboxyl group concentration is obtained. According to the present invention, an aromatic polyester having a good color due to its low alkali metal content is obtained.

INDUSTRIAL APPLICABILITY

The film of the present invention is excellent in heat resistance, mechanical properties and dimensional stability.

TABLE 7

|  |  | Ex. 1 | Ex. 2 | Ex. 3 | Ex. 4 | Ex. 5 | C. Ex. 1 | C. Ex. 2 | Ex. 6 | Ex. 7 | Ex. 9 | Ex. 10 |
|---|---|---|---|---|---|---|---|---|---|---|---|---|
| composition | NEO—H component (mol %) | 100 | 70 | 70 | 100 | 100 | 100 | 100 | 50 | 70 | 50 | 70.7 |
|  | Terephthalic acid component (mol %) | — | — | 30 | — | — | — | — | 50 | 30 | — | — |
|  | Naphthalene-dicarboxylic acid component (mol %) | — | 30 | — | — | — | — | — | — | — | 50 | 29.3 |
| Physical properties | Intrinsic viscosity (—) | 1.47 | 1.6 | 1.4 | 2.0 | 2.2 | 1.2 | 1.1 | 1.02 | 0.88 | 0.93 | 1.56 |
|  | Diethylene glycol component (mol %) | 5.0 | 6.0 | 7.2 | — | 7.0 | 12 | 14 | 7.0 | 7.8 | 6.0 | 7.5 |
|  | Terminal carboxyl group concentration (eq/ton) | 55 | 92 | 80 | — | 40 | 105 | — | 0.1 | 10.1 | 51.5 | 36.8 |
|  | Alkali metal content (ppm) | 27 | 20 | 23 | — | 25 | 30 | — | 15 | 19 | 16 | 20 |
|  | Tg (° C.) | 132 | 121 | 120 | — | — | 127 | — | 104 | 110 | 109.75 | 109.45 |
|  | Melting point (° C.) | 300 | 287 | 282 | — | — | 294 | 292 | 234 | 259 | 242.69 | 261.1 |

Ex.: Example
C. Ex.: Comparative Example

The invention claimed is:

1. An aromatic polyester comprising a dicarboxylic acid component and a diol component, wherein
   (i) the dicarboxylic acid component contains 50 to 100 mol % of a recurring unit represented by the following formula (A) and 50 to 0 mol % of a recurring unit represented by the following formula (B), and the diol component contains 90 to 100 mol % of a recurring unit represented by the following formula (C),

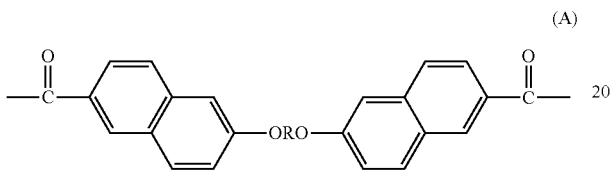

(A)

wherein R is an alkylene group having 2 to 10 carbon atoms,

(B)

wherein Ar is a hydrocarbon group having 2 to 10 carbon atoms;

—O—CH$_2$CH$_2$—O—   (C)

(ii) the aromatic polyester has an intrinsic viscosity measured at 35° C. by using a mixed solvent of P-chlorophenol and 1,1,2,2-tetrachloroethane (weight ratio of 40/60) of 0.4 to 3.0;
   (iii) the aromatic polyester has a content of a recurring unit represented by the following formula (D) of less than 10 mol %;

—O—CH$_2$CH$_2$—O—CH$_2$CH$_2$—O—   (D)

(iv) the aromatic polyester has a terminal carboxyl group concentration of 200 eq/ton or less; and
   (v) the aromatic polyester has an alkali metal content of 300 ppm or less.

2. The aromatic polyester according to claim 1, wherein the dicarboxylic acid component contains a recurring unit represented by the following formula (A-1) as the main constituent and the aromatic polyester has a melting point of 295° C. or higher

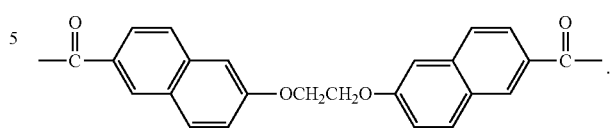

(A-1)

3. The aromatic polyester according to claim 1, wherein the dicarboxylic acid component contains 50 to 80 mol % of the recurring unit represented by the formula (A) and 50 to 20 mol % of a recurring unit represented by the following formula (B-1) and the aromatic polyester has a melting point of 225 to 265° C

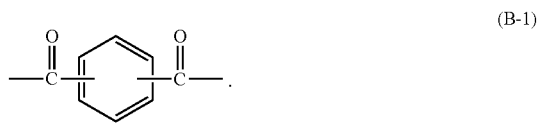

(B-1)

4. The aromatic polyester according to claim 1, wherein the dicarboxylic acid component contains 50 to 80 mol % of the recurring unit represented by the formula (A) and 50 to 20 mol % of a recurring unit represented by the following formula (B-2) and the aromatic polyester has a melting point of 235 to 270° C

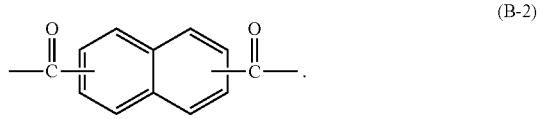

(B-2)

5. A process of manufacturing an aromatic polyester, comprising the steps of:
   (1) a first step in which, reacting a dicarboxylic acid component containing a compound represented by the following formula (a):

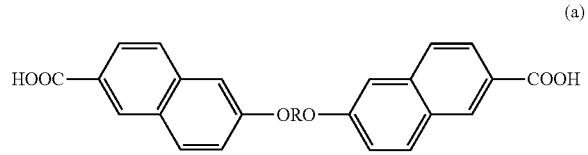

(a)

wherein R is an alkylene group having 2 to 10 carbon atoms,
   with a diol component containing ethylene glycol to obtain a polyester precursor containing a compound represented by the following formula (a-1):

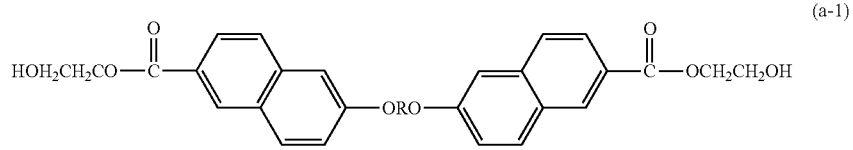

(a-1)

wherein R is an alkylene group having 2 to 10 carbon atoms,
and having an esterification rate of 85% or more; and
(2) a second step in which, polymerizing the polyester precursor in the presence of a polymerization catalyst.

6. The process according to claim 5, wherein the polyester precursor contains 50 to 100 mol % of the compound represented by the following formula (a-1):

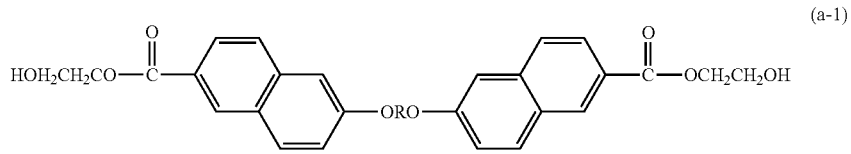

wherein R is an alkylene group having 2 to 10 carbon atoms,
and 50 to 0 mol % of a compound represented by the following formula (b-1):

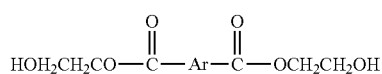

wherein Ar is a phenylene group or naphthalenediyl group.

7. The process according to claim 5, wherein the dicarboxylic acid component contains the compound represented by the following formula (a) as the main constituent:

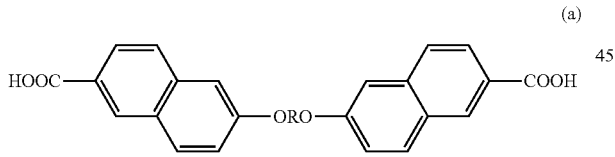

wherein R is an alkylene group having 2 to 10 carbon atoms.

8. The process according to claim 5, wherein the polyester precursor contains the compound represented by the following formula (a-1) as the main constituent:

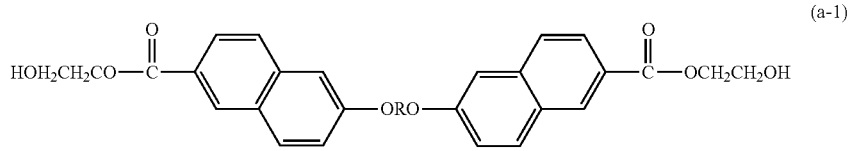

wherein R is an alkylene group having 2 to 10 carbon atoms.

9. The process according to claim 5, wherein the dicarboxylic acid component contains 50 to 80 mol % of the compound represented by the following formula (a):

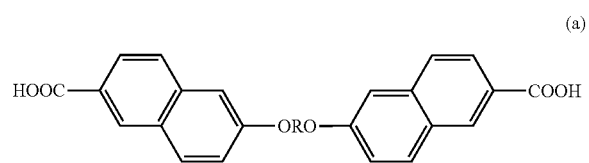

wherein R is an alkylene group having 2 to 10 carbon atoms, and 50 to 20 mol % of a compound represented by the following formula (b):

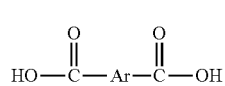

wherein Ar is a hydrocarbon group having 2 to 10 carbon atoms.

10. The process according to claim 5, wherein the polyester precursor contains 50 to 80 mol % of the compound represented by the following formula (a-1):

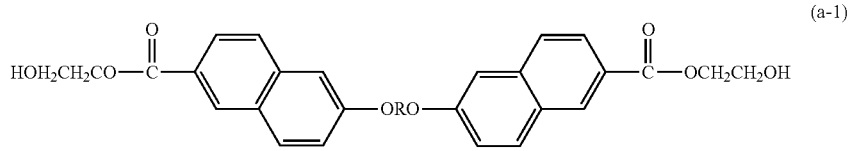

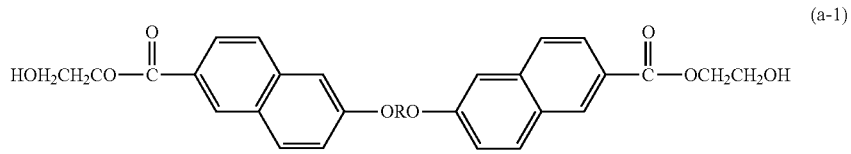

wherein R is an alkylene group having 2 to 10 carbon atoms,
and 50 to 20 mol % of the compound represented by the following formula (b-1):

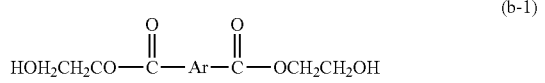

wherein Ar is a hydrocarbon group having 2 to 10 carbon atoms.

11. The process according to claim 5, wherein the compound represented by the following formula (b-1) is added to the polyester precursor obtained in the first step:

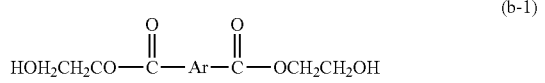

wherein Ar is a hydrocarbon group having 2 to 10 carbon atoms.

12. The process according to claim 5, wherein the first step is carried out at 10 to 200 kPa.

13. The process according to claim 5, wherein the aromatic polyester has an intrinsic viscosity measured at 35° C. by using a mixed solvent of P-chlorophenol and 1,1,2,2-tetrachloroethane (weight ratio of 40/60) of 0.4 to 1.5.

14. The process according to claim 5, wherein the aromatic polyester obtained in the second step is solid-phase polymerized.

15. A film made of the aromatic polyester of claim 1.

* * * * *